United States Patent
Yau et al.

(10) Patent No.: US 11,588,510 B2
(45) Date of Patent: Feb. 21, 2023

(54) NETWORK COMMUNICATION POWER SUPPLY WITH DIGITAL SIGNAL ISOLATION

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 180 days.

(21) Appl. No.: 17/125,376

(22) Filed: Dec. 17, 2020

(65) Prior Publication Data
US 2022/0069730 A1 Mar. 3, 2022

(30) Foreign Application Priority Data
Sep. 1, 2020 (TW) .................. 109129910

(51) Int. Cl.
*H04B 1/04* (2006.01)
*H04B 1/16* (2006.01)
(52) U.S. Cl.
CPC .................. *H04B 1/1607* (2013.01)
(58) Field of Classification Search
CPC ...... H04B 3/54; H04B 1/1607; H04B 5/0037; H04B 5/0081
See application file for complete search history.

(56) References Cited

U.S. PATENT DOCUMENTS

| | | | | |
|---|---|---|---|---|
| 9,658,631 | B2 * | 5/2017 | Liu | ........................ G01R 19/10 |
| 2009/0010032 | A1 * | 1/2009 | Chuang | ................... H02M 1/44 363/126 |

FOREIGN PATENT DOCUMENTS

| | | |
|---|---|---|
| TW | 200915833 A | 4/2009 |
| TW | 201916565 A | 4/2019 |
| TW | I675532 B | 10/2019 |
| WO | 2014/088867 A2 | 6/2014 |

OTHER PUBLICATIONS

Office Action dated Feb. 4, 2021 in TW Application No. 109129910, 5 pages.

* cited by examiner

*Primary Examiner* — Nhan T Le
(74) *Attorney, Agent, or Firm* — Muncy, Geissler, Olds & Lowe, P.C.

(57) ABSTRACT

A network communication power supply with digital signal isolation includes a transformer, a transformer drive circuit, a rectifier, and a modulation signal duty cycle detection circuit. The transformer has a primary side and a secondary side. The transformer drive circuit is coupled to the primary side, and receives a digital signal input. The transformer drive circuit converts the digital signal input into a drive signal with a duty cycle corresponding to a logic level of the digital signal input according to the logic level. The digital signal input includes a power content. The rectifier is coupled to the secondary side and converts the power content to provide a power source. The modulation signal duty cycle detection circuit is coupled to the rectifier and supplied power by the power source, and provides a digital signal output with a high or low level according to the duty cycle.

14 Claims, 2 Drawing Sheets

NETWORK COMMUNICATION POWER SUPPLY WITH DIGITAL SIGNAL ISOLATION

BACKGROUND

Technical Field

The present disclosure relates to a network communication power supply, and more particularly to a network communication power supply with digital signal isolation.

Description of Related Art

The statements in this section merely provide background information related to the present disclosure and do not necessarily constitute prior art.

With the advent of the 5G era, the demands of network communication servers, switches, and small cells have rapidly grown, and the design of power supplies is also developing toward high power, small size, and light weight. Moreover, as the power systems in telecommunications, networks, and computer systems have continuously improved requirements for safety, reliability, power density, and smart management in recent years, the status of isolation technology will become more and more important.

The challenge of digital power isolation is that it must be fast, accurate, and small in size to transmit analog or digital signals across the isolation. For example, in the current technology, photo couplers are often used to transmit analog or digital signals from the secondary side to the primary side, or from the primary side to the secondary side. The photo coupler is a combination of a pair of light-emitting and light-receiving elements, and it uses light to transmit signals, and is electrically insulated between the input end and the output end in systems. According to the characteristics of the photo coupler, it can be considered as a relay or a signal converter to achieve complete electrical isolation between the input end and the output end.

Please refer to FIG. 1, which shows a block circuit diagram of a conventional network communication power supply with digital signal isolation. For network communication (Netcom) power supplies, the required digital signals, such as AC pre-warning signals, power good signals, etc., are transmitted from the primary side to a load end in the secondary side. As shown in FIG. 1, the photo coupler 40A used for signal transmission needs to be powered by an additional auxiliary power Vaux to maintain the normal operation of the photo coupler 40A. For example, the auxiliary power Vaux provides power to supply a signal level converter (not shown) of the photo coupler 40A so that a high-level logic signal can be generated to the secondary side in the system before the power supply is officially activated. However, if there is no auxiliary power Vaux or the auxiliary power Vaux is removed, the high-level logic signal will not be normally generated to inform the secondary side in the system.

In particular, the auxiliary power Vaux is acquired by converting and processing an input power Vin through a transformer drive circuit 10A, a transformer 20A, and a rectifier 30A, and is used as the power supply for the photo coupler 40A that transmits a digital signal input Vsi on the primary side to a digital signal output Vso on the secondary side.

SUMMARY

An object of the present disclosure is to provide a network communication power supply with digital signal isolation to solve the problems of increased equipment (device) cost, complicated circuit control, and additional circuit design of providing the auxiliary power for supplying the photo coupler.

In order to achieve the above-mentioned object, the network communication power supply with digital signal isolation includes a transformer, a transformer drive circuit, a rectifier, and a modulation signal duty cycle detection circuit. The transformer has a primary side and a secondary side. The transformer drive circuit is coupled to the primary side, and receives a digital signal input and converts the digital signal input into a drive signal with a duty cycle corresponding to a logic level of the digital signal input according to the logic level. The digital signal input has a power content. The rectifier is coupled to the secondary side and converts the power content to provide a power source. The modulation signal duty cycle detection circuit is coupled to the rectifier and supplied power by the power source, and provides a digital signal output with a high or low level according to the duty cycle.

In one embodiment, the rectifier is a diode-capacitor rectifier.

In one embodiment, the rectifier includes a diode and a capacitor. An anode of the diode is connected to one end of the secondary side. A first end of the capacitor is connected to a cathode of the diode, and a second end of the capacitor is connected to the other end of the secondary side.

In one embodiment, the modulation signal duty cycle detection circuit includes a three-end voltage regulator, a filter unit, and a switch unit. The three-end voltage regulator has a cathode end, an anode end, and a reference end. The cathode end and the anode end receive the power source. The filter unit is coupled between the reference end and the anode end. The switch unit is coupled between the cathode end and the anode end.

In one embodiment, the filter unit includes a first capacitor and a first resistor. The first resistor is connected to the first capacitor in parallel.

In one embodiment, the transformer drive circuit drives the primary side of the transformer according to the duty cycle of the drive signal.

In one embodiment, when the duty cycle is greater than 50%, the digital signal output is high-level; when the duty cycle is less or equal to 50%, the digital signal output is low-level.

In one embodiment, the transformer drive circuit is an integrated circuit.

In one embodiment, the switch unit is a bipolar junction transistor.

In one embodiment, the rectifier further includes a first diode. The first diode is coupled between the anode of the diode and the reference end of the three-end voltage regulator.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DESCRIPTION

Figure 1:
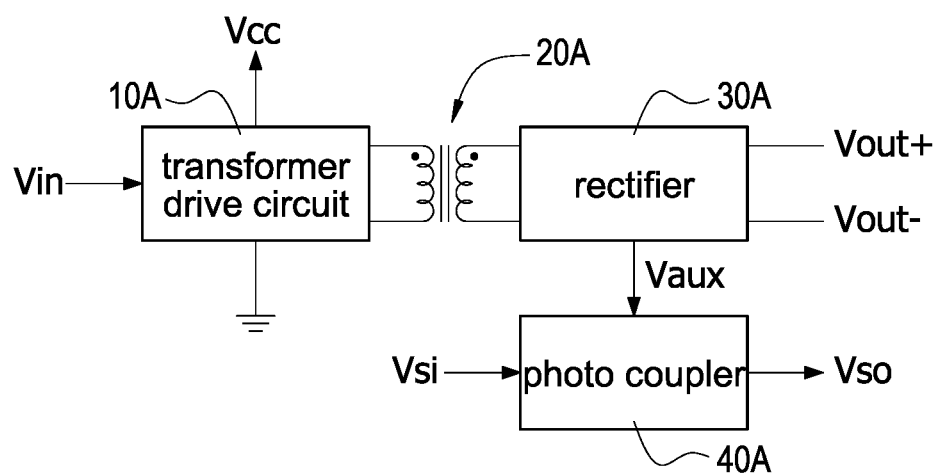
FIG. 1 is a block circuit diagram of a conventional network communication power supply with digital signal isolation.

Reference will now be made to the drawing figures to describe the present disclosure in detail. It will be understood that the drawing figures and exemplified embodiments of present disclosure are not limited to the details thereof.

Figure 2:
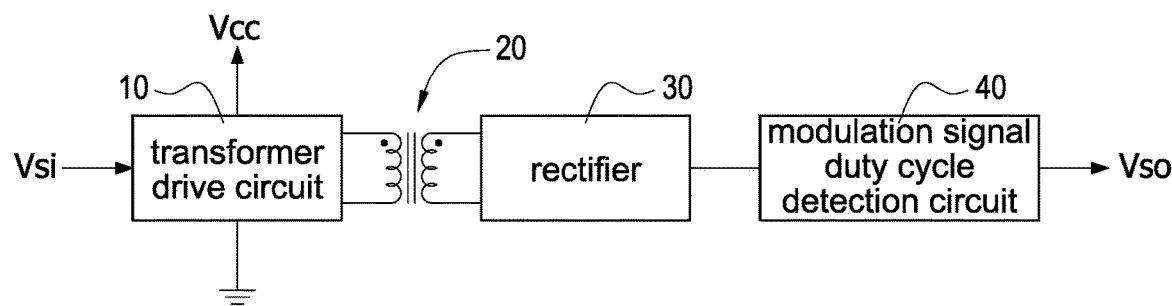
FIG. 2 is a block circuit diagram of a network communication power supply with digital signal isolation according to the present disclosure.
Figure 3:
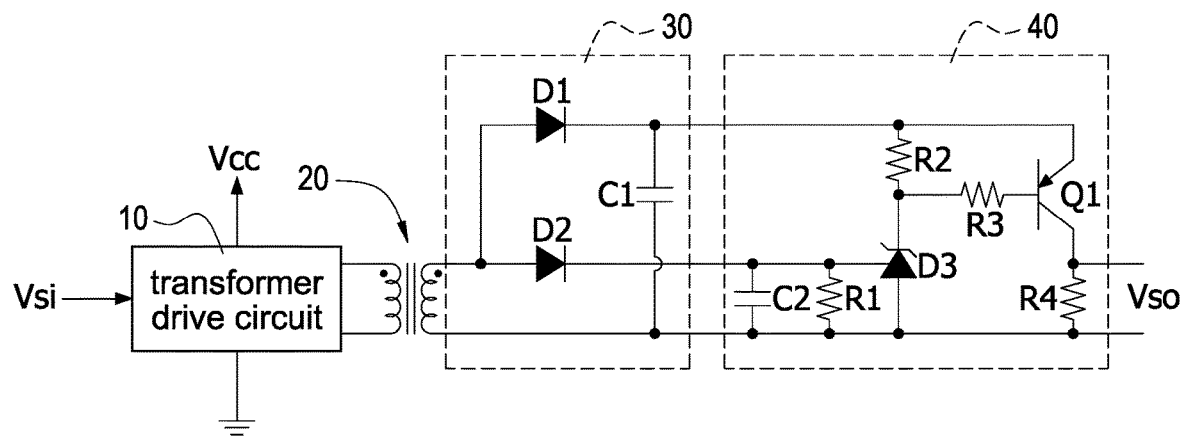
FIG. 3 is a circuit diagram of the network communication power supply with digital signal isolation according to the present disclosure.

Please refer to FIG. 2 and FIG. 3, which show a block circuit diagram and a circuit diagram of a network communication power supply with digital signal isolation according to the present disclosure, respectively. The network communication power supply with digital signal isolation (hereinafter referred to as "network communication power supply") includes a transformer 20, a transformer drive circuit 10, a rectifier 30, and a modulation signal duty cycle detection circuit 40. The transformer 20 has a primary side and a secondary side, and the primary side and the secondary side are electrically insulated and circuits coupled at the two sides are isolated.

The transformer drive circuit 10 is coupled to the primary side of the transformer 20, and receives a digital signal input Vsi. The transformer drive circuit 10 is also referred to as a transformer driver, which can be, for example but not limited to, implemented by an integrated circuit (IC). The transformer drive circuit 10 converts the digital signal input Vsi into a drive signal with a duty cycle corresponding to a logic level of the digital signal input Vsi according to the logic level. In other words, when the logic level of the digital signal input Vsi is different, the duty cycle of the drive signal converted by the transformer drive circuit 10 is different. The transformer drive circuit 10 uses the drive signal with the duty cycle to drive the secondary side of the transformer 20. In the present disclosure, the digital signal input Vsi has a power content, that is, in addition to a data content, the digital signal input Vsi also has the power content. Therefore, the transmission of the data and power can be integrated in the network. Based on this, the network communication power supply of the present disclosure neither requires using the photo coupler shown in FIG. 1 nor using the auxiliary power which is provided to supply power to the photo coupler shown in FIG. 1.

The rectifier 30 is coupled to the secondary side of the transformer 20 and converts the power content to provide a power source. As shown in FIG. 3, the rectifier 30 is a diode-capacitor rectifier. Specifically, the rectifier 30 includes a diode D1 and a capacitor C1. An anode of the diode D1 is connected to one end of the secondary side (such as a dot end of the secondary side) of the transformer 20. A first end of the capacitor C1 is connected to a cathode of the diode D1, and a second end of the capacitor C1 is coupled to the other end of the secondary side (such as a non-dot end of the secondary side) of the transformer 20. In one embodiment, a square-wave power coupled at the secondary side of the transformer 20 is rectified by the rectifier 30 so as to generate (output) the power source at two ends of the capacitor C1.

The modulation signal duty cycle detection circuit 40 is coupled to the rectifier 30. That is, the power source generated at the two ends of the capacitor C1 of the rectifier 30 is provided to supply power to the modulation signal duty cycle detection circuit 40. As shown in FIG. 3, the modulation signal duty cycle detection circuit 40 includes a three-end voltage regulator D3, a filter unit having a first capacitor C2 and a first resistor R1 connected to the first capacitor C2 in parallel, and a switch unit Q1. The switch unit Q1 is, for example but not limited to, a bipolar junction transistor (BJT). The three-end voltage regulator D3 has a cathode end, an anode end, and a reference end. The cathode end and the anode end are coupled to the capacitor C1 of the rectifier 30 in parallel, and receive the power source to supply the required power to the modulation signal duty cycle detection circuit 40. The filter unit composed of the first capacitor C2 and the first resistor R1 is coupled between the reference end and the anode end. The switch unit Q1 is coupled between the cathode end and the anode end.

In one embodiment, it is assumed that the three-end voltage regulator D3 has a 2.5-volt reference voltage inside, that is, when a voltage received at the reference end of the three-end voltage regulator D3 is greater than the reference voltage (i.e., 2.5 volts), the three-end voltage regulator D3 is in a state of reverse-breakdown (reverse-bias), and therefore a stabilized (fixed) voltage of 2.5 volts provided between the cathode end and the anode end can achieve the function of a voltage regulator. Therefore, as shown in FIG. 3, the electrical energy coupled through the secondary side of the transformer 20 is filtered by the filter unit composed of the first capacitor C2 and the first resistor R1, and if a voltage of the filtered electrical energy is greater than 2.5 volts, a voltage of 2.5 volts is provided between the cathode end and the anode end.

Under a circuit design, when the duty cycle of the drive signal converted by the transformer drive circuit 10 is greater than a duty cycle value, such as but not limited to 50%, the power source outputted from the diode D1 and the capacitor C1 of the rectifier 30 will be greater than 2.5 volts. On the contrary, when the duty cycle of the drive signal is less than or equal to the duty cycle value, the power source outputted from the diode D1 and the capacitor C1 of the rectifier 30 will be less than or equal to 2.5 volts.

Specifically, since an emitter of the switch unit Q1 (i.e., BJT) is coupled to the diode D1 and the capacitor C1 of the rectifier 30, and a base of the switch unit Q1 is coupled to the cathode end of the three-end voltage regulator D3, a voltage at the base of the switch unit Q1 is 2.5 volts and a voltage at the emitter of the switch unit Q1 is greater than 2.5 volts when the power source is greater than 2.5 volts (correspondingly, the voltage received at the reference end of the three-end voltage regulator D3 is greater than 2.5 volts). At this condition, the switch unit 10 is turned on so that a digital signal output Vso outputted from the modulation signal duty cycle detection circuit 40 is high-level in voltage. On the contrary, the voltage at the base of the switch unit Q1 is less than 2.5 volts (and also less than the voltage at the emitter) and the voltage at the emitter of the switch unit Q1 is less than 2.5 volts when the power source is less than 2.5 volts (correspondingly, the voltage received at the reference end of the three-end voltage regulator D3 is less than 2.5 volts). At this condition, the switch unit 10 is turned off so that the digital signal output Vso outputted from the modulation signal duty cycle detection circuit 40 is low-level in voltage. Accordingly, the modulation signal duty cycle detection circuit 40 can output the high-level digital signal output Vso or the low-level digital signal output Vso according to the duty cycle of the drive signal.

As shown in FIG. 3, the rectifier 30 further includes a first diode D2, and the first diode D2 is coupled between the anode of the diode D1 and the reference end of the three-end voltage regulator D3. The first diode D2 is used to limit that the current passing through the first diode D2 can only go in one direction (i.e., the forward direction) from the transformer 20 to the modulation signal duty cycle detection circuit 40. The modulation signal duty cycle detection circuit 40 further includes a second resistor R2, a third resistor R3, and a fourth resistor R4. The third resistor R3 is coupled between the base of the switch unit Q1 and the cathode end of the three-end voltage regulator D3 for limiting a current flowing into the base of the switch unit Q1, thereby protecting the switch unit Q1. The second resistor R2 is coupled between the cathode of the diode D1 of the rectifier 30 and the cathode end of the three-end voltage regulator D3 for ensuring that the switch unit Q1 is turned off when the power source is less than 2.5 volts and the voltage at the base of the switch unit Q1 is less than the voltage at the emitter of the switch unit Q1. The fourth resistor R4 is coupled between a collector of the switch unit Q1 and the anode end of the three-end voltage regulator D3 for being as an output end of outputting the digital signal output Vso.

In conclusion, the present disclosure has following features and advantages:

1. The network communication power supply of the present disclosure does not requires using the photo coupler so as to reduce equipment (device) cost and simply circuit control.

2. Due to the absence of the photo coupler, no auxiliary power for supplying power to the photo coupler is required so as to omit the circuit design of the auxiliary power.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A network communication power supply with digital signal isolation, comprising:
   a transformer having a primary side and a secondary side;
   a transformer drive circuit coupled to the primary side, and configure to receive a digital signal input and convert the digital signal input into a drive signal with a duty cycle corresponding to a logic level of the digital signal input according to the logic level, wherein the digital signal input having a power content;
   a rectifier coupled to the secondary side and configured to convert the power content to provide a power source; and
   a modulation signal duty cycle detection circuit coupled to the rectifier and supplied power by the power source provided from the rectifier, and configured to provide a digital signal output with a high or low level according to the duty cycle.

2. The network communication power supply with digital signal isolation as claimed in claim 1, wherein the rectifier is a diode-capacitor rectifier.

3. The network communication power supply with digital signal isolation as claimed in claim 2, wherein the rectifier comprises:
   a diode, an anode of the diode connected to one end of the secondary side, and
   a capacitor, a first end of the capacitor connected to a cathode of the diode, and a second end of the capacitor connected to the other end of the secondary side.

4. The network communication power supply with digital signal isolation as claimed in claim 2, wherein the modulation signal duty cycle detection circuit comprises:
   a three-end voltage regulator having a cathode end, an anode end, and a reference end, the cathode end and the anode end configured to receive the power source;
   a filter unit coupled between the reference end and the anode end; and
   a switch unit coupled between the cathode end and the anode end.

5. The network communication power supply with digital signal isolation as claimed in claim 3, wherein the modulation signal duty cycle detection circuit comprises:
   a three-end voltage regulator having a cathode end, an anode end, and a reference end, the cathode end and the anode end configured to receive the power source;
   a filter unit coupled between the reference end and the anode end; and
   a switch unit coupled between the cathode end and the anode end.

6. The network communication power supply with digital signal isolation as claimed in claim 4, wherein the filter unit comprises:
   a first capacitor; and
   a first resistor connected to the first capacitor in parallel.

7. The network communication power supply with digital signal isolation as claimed in claim 5, wherein the filter unit comprises:
   a first capacitor; and
   a first resistor connected to the first capacitor in parallel.

8. The network communication power supply with digital signal isolation as claimed in claim 1, wherein the transformer drive circuit is configured to drive the primary side of the transformer according to the duty cycle of the drive signal.

9. The network communication power supply with digital signal isolation as claimed in claim 1, wherein when the duty cycle is greater than 50%, the digital signal output is high-level; when the duty cycle is less or equal to 50%, the digital signal output is low-level.

10. The network communication power supply with digital signal isolation as claimed in claim 1, wherein the transformer drive circuit is an integrated circuit.

11. The network communication power supply with digital signal isolation as claimed in claim 4, wherein the switch unit is a bipolar junction transistor.

12. The network communication power supply with digital signal isolation as claimed in claim 5, wherein the switch unit is a bipolar junction transistor.

13. The network communication power supply with digital signal isolation as claimed in claim 4, wherein the rectifier further comprises:
   a first diode coupled between the anode of the diode and the reference end of the three-end voltage regulator.

14. The network communication power supply with digital signal isolation as claimed in claim 5, wherein the rectifier further comprises:
   a first diode coupled between the anode of the diode and the reference end of the three-end voltage regulator.

* * * * *